United States Patent
Zahn et al.

(10) Patent No.: US 8,271,922 B2
(45) Date of Patent: Sep. 18, 2012

(54) SYSTEM AND METHOD FOR CLOCK OPTIMIZATION TO ACHIEVE TIMING SIGNOFF IN AN ELECTRONIC CIRCUIT AND ELECTRONIC DESIGN AUTOMATION TOOL INCORPORATING THE SAME

(75) Inventors: Bruce E. Zahn, Allentown, PA (US); Gerard M. Blair, Bath, PA (US)

(73) Assignee: LSI Corporation, Milpitas, CA (US)

( * ) Notice: Subject to any disclaimer, the term of this patent is extended or adjusted under 35 U.S.C. 154(b) by 338 days.

(21) Appl. No.: 12/423,001

(22) Filed: Apr. 14, 2009

(65) Prior Publication Data

US 2010/0262939 A1 Oct. 14, 2010

(51) Int. Cl.
*G06F 9/455* (2006.01)
*G06F 17/50* (2006.01)

(52) U.S. Cl. ......... 716/113; 716/110; 716/111; 716/114

(58) Field of Classification Search .................... 716/113
See application file for complete search history.

(56) References Cited

U.S. PATENT DOCUMENTS

| 7,475,297 | B1 * | 1/2009 | Manaker, Jr. ............... 714/700 |
| 7,694,242 | B1 * | 4/2010 | Li et al. ...................... 716/100 |
| 2006/0117285 | A1 * | 6/2006 | Kosugi et al. ................ 716/6 |
| 2007/0150846 | A1 * | 6/2007 | Furnish et al. ............... 716/8 |
| 2007/0180415 | A1 * | 8/2007 | Pundoor ...................... 716/6 |
| 2008/0129362 | A1 * | 6/2008 | Kawai ........................ 327/292 |

* cited by examiner

*Primary Examiner* — Paul Dinh
*Assistant Examiner* — Bryce Aisaka

(57) ABSTRACT

A system and method for clock optimization to achieve timing signoff in an electronic circuit and an EDA tool that embodies the system or the method. In one embodiment, the system includes: (1) a clock cell identifier/sorter configured to identify at least some clock cells in a clock network associated with an electronic circuit design and sort the cells according to breadth, (2) a slack analyzer associated with the clock cell identifier/sorter and configured to identify flops that are downstream of the cells and determine a worst setup and hold timing slack thereof and (3) a clock cell delay adjuster associated with the slack analyzer and configured to adjust delays of the cells subject to the worst setup and hold timing slack.

20 Claims, 3 Drawing Sheets

SYSTEM AND METHOD FOR CLOCK OPTIMIZATION TO ACHIEVE TIMING SIGNOFF IN AN ELECTRONIC CIRCUIT AND ELECTRONIC DESIGN AUTOMATION TOOL INCORPORATING THE SAME

TECHNICAL FIELD

This application is directed, in general, to integrated circuits (ICs) and, more specifically, to a system and method for clock optimization to achieve timing signoff in an electronic circuit and electronic design automation tool incorporating the same.

BACKGROUND

Electronic circuit designers use electronic design automation (EDA) tools, a category of computer aided design (CAD) tools, to create representations of the cells in a particular circuit and the conductors (called "interconnects" or "nets") that couple the cells together. EDA tools allow designers to construct a circuit design, generate a layout and simulate its performance using a computer and without requiring the costly and lengthy process of fabrication. EDA tools are indispensable for designing modern, very-large-scale integrated circuits (VSLICs).

Timing is a major concern in all IC designs, because circuits will not operate properly unless signals can propagate properly through them. Consequently, "timing signoff" is a required step in the designing of a circuit, particularly an IC, that takes place after layout of the IC. Timing signoff involves using one type of EDA tool, a signoff analysis tool, to determine the time that signals will take to propagate through the circuit. "Setup" violations occur if signal propagation speeds are too slow. "Hold" violations occur if signal propagation speeds are too fast. Signal propagations speeds are particularly important in critical paths. For this reason, substantial effort is often expended to resolve setup and hold violations in the critical paths of an IC design. This is done during timing signoff by adjusting the speed of the cells in the critical paths.

Cells are made larger to increase the speed of a critical path that produces setup violations, and delay cells are added to decrease the speed of a critical path that produces hold violations. Unfortunately, both of these adjustments increase the size (area) and power dissipation of a path. Since a modern IC has thousands, and perhaps millions, of paths that may require adjustment, the combined effect on size and power requirements can be substantial and mean the difference between an IC that is commercially viable and one that is not.

SUMMARY

One aspect provides a system for clock optimization to achieve timing signoff in an electronic circuit. In one embodiment, the system includes: (1) a clock cell identifier/sorter configured to identify at least some clock cells in a clock network associated with an electronic circuit design and sort the cells according to breadth, (2) a slack analyzer associated with the clock cell identifier/sorter and configured to identify flops that are downstream of the cells and determine a worst setup and hold timing slack thereof and (3) a clock cell delay adjuster associated with the slack analyzer and configured to adjust delays of the cells subject to the worst setup and hold timing slack.

Another aspect provides a method of clock optimization to achieve timing signoff in an electronic circuit. In one embodiment, the method includes: (1) identifying at least some clock cells in a clock network associated with an electronic circuit design, (2) sorting the cells according to breadth, (3) identifying flops that are downstream of the cells, (4) determining a worst setup and hold timing slack of the flops and (5) adjusting delays of the cells subject to the worst setup and hold timing slack.

Yet another aspect provides an EDA tool. In one embodiment, the EDA tool includes: (1) a signoff analysis tool configured to perform a timing signoff and having: (1a) a clock cell identifier/sorter configured to identify at least some clock cells in a clock network associated with an integrated circuit design and sort the cells according to breadth, (1b) a slack analyzer associated with the clock cell identifier/sorter and configured to identify flops that are downstream of the cells, determine a worst setup and hold timing slack thereof and determine a worst slack on input data pins on the flops and (1c) a clock cell delay adjuster associated with the slack analyzer and configured to adjust delays of the cells subject to the worst setup and hold timing slack and the worst slack and (2) an engineering change order generator associated with the clock cell delay adjuster and configured to transform an output thereof into an engineering change order file.

BRIEF DESCRIPTION

Reference is now made to the following descriptions taken in conjunction with the accompanying drawings, in which.

DETAILED DESCRIPTION

Figure 1:
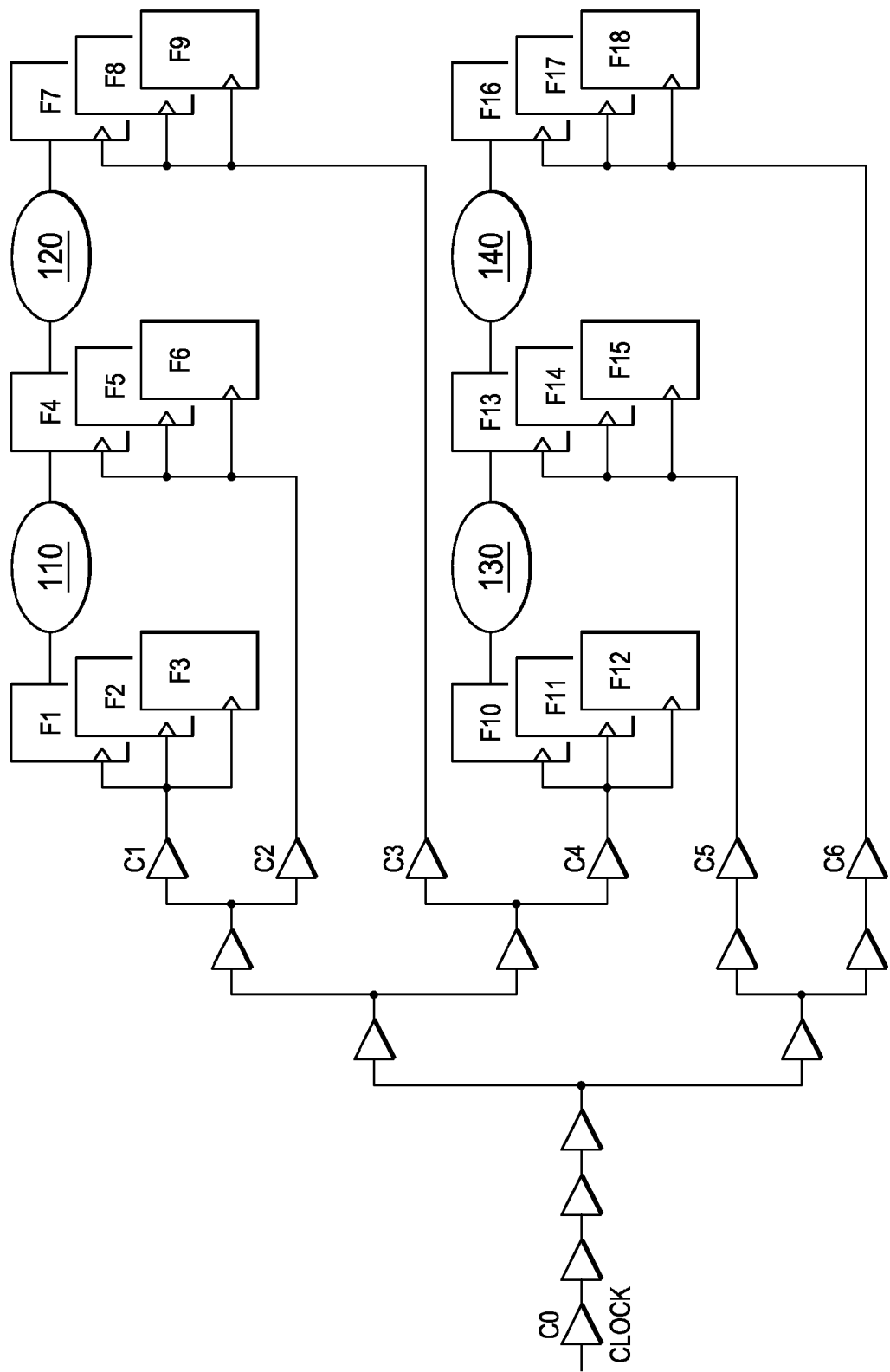
FIG. 1 is a diagram of one embodiment of an electronic circuit in which clock optimization may be carried out to achieve timing signoff.

As stated above, both increasing the speed of cells to increase the speed of a path or adding delay cells to decrease the speed of a path cause the overall size and power dissipation of an IC to grow. What is needed is a way to adjust path speed during timing signoff that does not by its nature adversely affect the size or power performance of the IC. What is needed is a way to resolve timing violations in data paths without having to change the data paths themselves.

During the design of an IC, conventional EDA tools are able to construct clock networks (colloquially called "trees") having paths ("branches") and clock cells that together provide the appropriate delays the paths appear to require. The delays are called "skew." Unfortunately, the clock networks that result are constructed without the detailed, accurate data regarding cell and timing characteristics employed during timing signoff. Thus, the skew may still give rise to setup and hold violations discovered during timing signoff. Never before has an EDA tool adjusted the clock network during timing signoff to correct setup or hold violations.

Described herein are various embodiments of a system and method for clock optimization to achieve timing signoff in an electronic circuit and electronic design automation tool incorporating the same. The system, method and EDA tool are employed during timing signoff to adjust delays in paths of the clock network. Timing violations in a design are analyzed, and optimal clock delay adjustments to correct timing violations are determined. By adjusting the clock network to correct timing violations, a substantial savings can be realized in terms of power and area, and the data paths in the electronic circuit can remain changed.

Certain embodiments of the clock optimization system and method allow delays to certain clock cells to be adjusted to repair timing violations. This allows many paths to be corrected with minimal changes to the clock network, saving area and power. Certain other embodiments are integrated with the existing timing signoff process. This potentially provides one or more of the following benefits: (1) the use of signoff-quality timing to achieve high-quality results, (2) the elimination of correlation violations with the EDA tool or tools that were employed to design and lay out the circuit and (3) the making of design-specific modifications to yield a faster turn-around time (TAT).

In various embodiments to be illustrated and described, the clock optimization system and method cooperate with an otherwise conventional signoff analysis tool. One example of such a signoff analysis tool is Primetime-SI® (commercially available from Synopsys, Inc., of Mountain View, Calif.). In certain embodiments, the clock optimization system and method are run within the Primetime-SI® tool.

In general, the described embodiments of the system and method carry out the following general steps: (1) each clock cell is initialized with attributes that represent the worst setup and hold timing slack information, (2) each clock cell is processed based on its breadth (i.e., the number of paths that include the clock cell, beginning with the clock cell located at the head of the clock network), (3) during processing of each clock cell, the delay of that clock cell is adjusted to the degree possible to correct timing violations and (4) slack values are updated on clock cells affected by any adjustments in delay made in the previous step.

FIG. 1 is a diagram of one embodiment of an electronic circuit in which clock optimization may be carried out to achieve timing signoff. The circuit of FIG. 1 shows a single clock network starting at a source called "CLOCK" associated with a clock cell C0 and includes clock cells C1-C6 driven by other clock cells that are shown but not referenced. The clock cells C1-C6 drive destination flip-flops (or "flops") F1-F18 that provide clock signals for respective data paths 110, 120, 130, 140. Transfers occur from flops F1-3 to flops F4-6, from flops F4-6 to flops F7-9, from flops F10-F12 to flops F13-F15 and from flops F13-F15 to flops F16-F18.

In the illustrated embodiment, all the clock cells in the clock network are identified and processed. For each of these cells, the downstream flops are identified, and the worst setup and hold timing slack of any of these downstream flops is determined. For example, if the clock cell being processed is "C2," the downstream flops of "C2" are flops F4-6. These flops have a timing path to flops F7-9. The worst (i.e., most restrictive) setup and hold slack from flops F4-F6 to any of flops F7-9 is then determined. Any paths where the transmitting ("launch") and receiving ("capture") flops are both in the list of downstream flops are excluded. Adjusting clock delays on these paths will not improve timing, since the launch and capture clocks are delayed equally. For the example, it is assumed that the hold and setup slack for these downstream flops are −100 ps and 400 ps respectfully. The hold violation of −100 ps can be corrected by delaying the clock cell "C2." For example, adding 200 ps of delay to "C2" results in a hold and setup slack of 100 ps and 300 ps respectfully. It can be seen that the amount of positive slack limits the amount of delay that can be added. Therefore, were, for example, the setup slack to be 50 ps instead of 400 ps, the hold violation could not be fixed by adjusting the delay of "C2."

Figure 2:
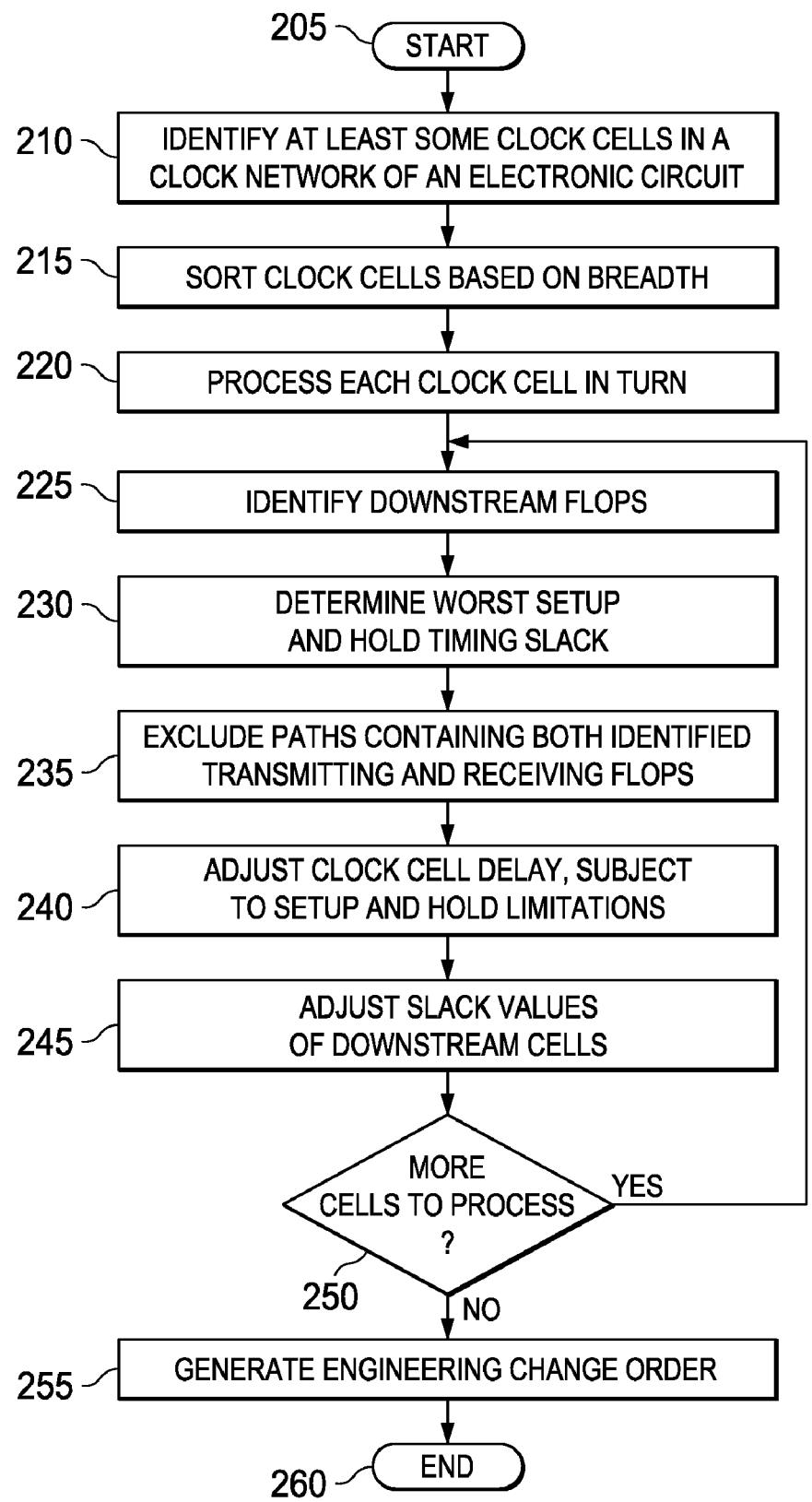
FIG. 2 is a flow diagram of one embodiment of a method of clock optimization to achieve timing signoff in an electronic circuit.

FIG. 2 is a flow diagram of one embodiment of a method of clock optimization to achieve timing signoff in an electronic circuit. The method begins in a start step 205. In a step 210, at least some of the clock cells in a clock network are identified (e.g., those associated with critical paths that exhibit setup or hold violations). In the illustrated embodiment, the clock cells are initialized with the following information: (1) previous path hold slack, (2) current path hold slack and (3) current path setup slack.

In a step 215, the identified clock cells are sorted based on their breadth (i.e., how many paths of the clock network include the clock cells). By processing the cell changes in this order, the minimal number of clock cell modification is required to correct timing violations. In a step 220, each cell is processed in turn.

In a step 225, for each of these cells, the downstream flops are identified. Next, the worst setup and hold timing slack of any of these downstream flops is determined in a step 230. This is because adding delay to a clock cell to address a timing issue may cause a hold time issue on a previously-processed path. The worst slack on the input data pins on the downstream flops is another limiting factor in determining the delay adjustment that can be applied to a clock cell.

In a step 235, paths containing both identified transmitting and receiving flops are excluded as described above. In a step 240, clock cell delay is adjusted, subject to the aforementioned setup and hold limitations. If the violation is a setup violation, delay is increased. If the violation is a hold violation, delay is reduced. In one embodiment, if insufficient timing slack margin exists to resolve the timing violation, further adjustment may be possible by substituting a faster clock cell, substituting a slower clock cell or adding a further clock cell. However, it should be understood that the clock cells should be of the same general size or sufficient space should exist in the layout to accommodate the substituted or added cell. A cell library having cells of different delay characteristic but generally of the same size (i.e., footprint) is advantageous in this embodiment, since the layout should be considered as being fixed for timing signoff.

In a step 245, slack values in the downstream cells of the clock cell that was adjusted are adjusted by the delay estimate. In a decisional step 250, it is determined whether there are more clock cells to process. If so, the steps 225-245 are repeated for another clock cell. If not, the method proceeds to a step 255 in which the adjustments are applied to the affected clock cells, and the timing is updated to determine whether the resulting timing is satisfactory. In one embodiment, further clock delay adjustment is performed at this point. When clock cell adjustments are deemed satisfactory, the resulting changes are transformed into an engineering change order (ECO) file in a step 255 to be implemented in the layout tool. The method ends in an end step 260.

Figure 3:
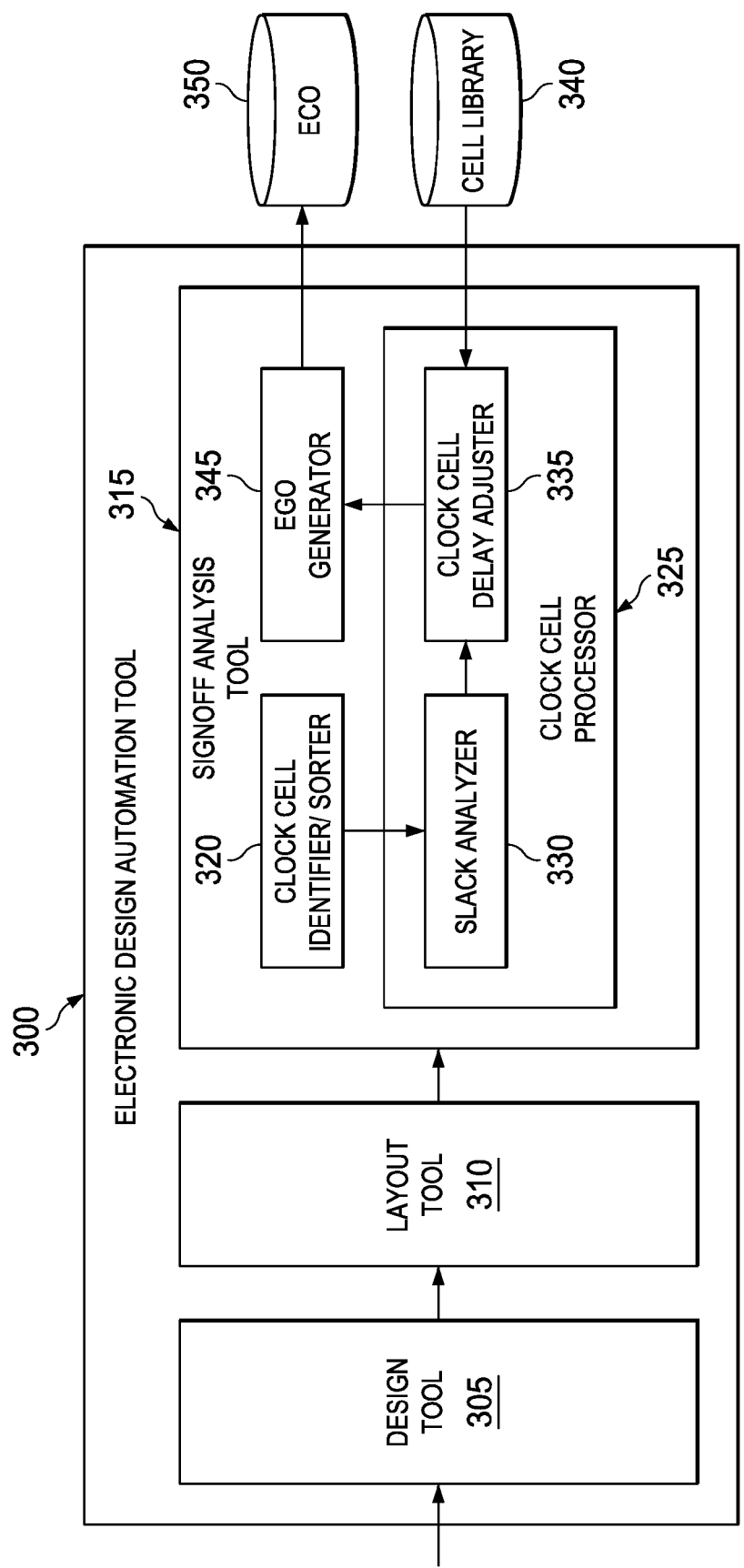
FIG. 3 is a block diagram of one embodiment of an EDA tool in which clock optimization to achieve timing signoff is carried out.

FIG. 3 is a block diagram of one embodiment of an EDA tool 300 in which clock optimization to achieve timing signoff is carried out. The EDA tool 300 is configured overall to transform a concept for an electronic circuit into a functioning, manufacturable electronic circuit (e.g., an IC).

The EDA tool 300 includes a design tool 305 configured to produce a register transfer logic (RTL) representation of an electronic circuit. A layout tool 310 is configured to transform the RTL representation into a physical layout of cells and interconnects.

At this point, timing signoff needs to be performed to ensure that the electronic circuit will operate as expected at its target speed (i.e., clock frequency). Accordingly, the EDA tool 300 includes a signoff analysis tool 315 configured to perform the timing signoff. Among other things, the signoff analysis tool 315 includes a clock cell identifier/sorter 320. The clock cell identifier/sorter 320 is configured to identify at least some of the clock cells in a clock network and sort the same according to breadth.

The signoff analysis tool 315 further includes a clock cell processor 325. The clock cell processor 325 includes a slack analyzer 330 and a clock cell delay adjuster 335. The slack analyzer 330 is configured to identify flops that are downstream of each clock cell, determine the worst setup and hold timing slack of any of these downstream flops and determine the worst slack on the input data pins on the downstream flops. The slack analyzer 330 is further configured to exclude paths containing both identified transmitting and receiving flops.

The clock cell delay adjuster 335 is configured to adjust clock cell delay subject to the aforementioned setup and hold limitations. As described above, if insufficient timing slack margin exists to resolve the timing violation, further adjustment may be possible by substituting a faster clock cell, substituting a slower clock cell or adding a further clock cell. Accordingly, a cell library 340 is available to the clock cell delay adjuster 335. In the illustrated embodiment, the clock cell delay adjuster 335 is further configured to employ the cell library 340 to effect such substitutions or additions. As described above, the clock cell processor 325 may be invoked multiple times to reach timing signoff.

The signoff analysis tool 315 further includes an ECO generator 345. The ECO generator 345 is configured to transform the output of the clock cell delay adjuster 335 into an ECO file to be implemented in the layout tool 310. The result is an ECO file 350 that may be applied to effect the adjustments made by the clock cell delay adjuster 335.

Those skilled in the art to which this application relates will appreciate that other and further additions, deletions, substitutions and modifications may be made to the described embodiments.

What is claimed is:

1. A system for clock optimization to achieve timing signoff in an electronic circuit, comprising:
    a clock cell identifier/sorter configured to identify at least some clock cells in a clock network associated with an electronic circuit design and sort said at least some clock cells according to breadth in an order from a broader breadth to a narrower breadth, wherein breadth of a clock cell of said at least some clock cells is a number of data paths of circuit elements driven by said clock cell of said clock network;
    a slack analyzer associated with said clock cell identifier/sorter and configured to process said at least some clock cell in said order by identifying flops in said data paths that are downstream of said at least some clock cells and determining a worst setup and hold timing slack thereof; and
    a clock cell delay adjuster associated with said slack analyzer and configured to adjust delays of said at least some clock cells subject to said worst setup and hold timing slack.

2. The system as recited in claim 1 wherein said slack analyzer is further configured to determine a worst slack on input data pins on said flops and said clock cell delay adjuster is further configured to adjust said delays subject to said worst slack.

3. The system as recited in claim 2 wherein said slack analyzer is further configured to exclude paths containing both identified transmitting and receiving flops.

4. The system as recited in claim 1 wherein said system is embodied in a timing signoff tool included in an electronic design automation tool, comprising:
    a design tool configured to produce a register transfer logic representation of an electronic circuit; and
    a layout tool configured to transform said register transfer logic representation into a physical layout of cells and interconnects and implement an engineering change order file with respect thereto.

5. The system as recited in claim 1 wherein said clock cell delay adjuster is further configured to cooperate with a cell library to carry out at least one of:
    substituting a faster clock cell,
    substituting a slower clock cell, and
    adding a further clock cell.

6. The system as recited in claim 5 wherein said faster clock cell and said slower clock cell have identical footprints.

7. The system as recited in claim 1 wherein said slack analyzer and said clock cell delay adjuster are invoked multiple times to reach timing signoff.

8. A method of clock optimization to achieve timing signoff in an electronic circuit, comprising:
    identifying at least some clock cells in a clock network associated with an electronic circuit design;
    sorting said at least some clock cells according to breadth in an order of a broader breadth to a narrower breadth, wherein breadth of a clock cell of said at least some clock cells is a number of data paths of said clock network that include said clock cell; and
    processing said at least some clock cells in said order, including:
        identifying flops in said data paths that are downstream of said at least some clock cells;
        determining a worst setup and hold timing slack of said flops; and
        adjusting delays of said at least some clock cells subject to said worst setup and hold timing slack, wherein said determining and said adjusting are performed by a processor.

9. The method as recited in claim 8 further comprising:
    determining a worst slack on input data pins on said flops; and
    adjusting said delays subject to said worst slack.

10. The method as recited in claim 9 further comprising excluding paths containing both identified transmitting and receiving flops.

11. The method as recited in claim 8 wherein said method is carried out in a timing signoff tool included in an electronic design automation tool that further performs:
    producing a register transfer logic representation of an electronic circuit;
    transforming said register transfer logic representation into a physical layout of cells and interconnects; and
    implementing an engineering change order file with respect to said physical layout.

12. The method as recited in claim 8 further comprising employing a cell library to carry out at least one of:
    substituting a faster clock cell,
    substituting a slower clock cell, and
    adding a further clock cell.

13. The method as recited in claim 12 wherein said faster clock cell and said slower clock cell have identical footprints.

14. The method as recited in claim 8 further comprising carrying out said determining and said adjusting multiple times to reach timing signoff.

15. An electronic design automation tool, comprising:
a signoff analysis tool configured to perform a timing signoff and including:
- a clock cell identifier/sorter configured to identify at least some clock cells in a clock network associated with an integrated circuit design and sort said at least some clock cells according to breadth in an order of a broader breadth to a narrower breadth, wherein breadth of a clock cell of said at least some clock cells is a number of data paths of said clock network that include said clock cell,
- a slack analyzer associated with said clock cell identifier/sorter and configured to process said at least some clock cells in said order by identifying identify flops in said data paths that are downstream of said at least some clock cells, determining a worst setup and hold timing slack thereof and determining a worst slack on input data pins on said flops,
- a clock cell delay adjuster associated with said slack analyzer and configured to adjust delays of said at least some clock cells subject to said worst setup and hold timing slack and said worst slack; and
- an engineering change order generator associated with said clock cell delay adjuster and configured to transform an output thereof into an engineering change order file.

16. The electronic design automation tool as recited in claim 15 wherein said slack analyzer is further configured to exclude paths containing both identified transmitting and receiving flops.

17. The electronic design automation tool as recited in claim 15 further comprising:
- a design tool configured to produce a register transfer logic representation of an electronic circuit; and
- a layout tool configured to transform said register transfer logic representation into a physical layout of cells and interconnects and implement said engineering change order file with respect thereto.

18. The electronic design automation tool as recited in claim 15 wherein said clock cell delay adjuster is further configured to cooperate with a cell library to carry out at least one of:
- substituting a faster clock cell,
- substituting a slower clock cell, and
- adding a further clock cell.

19. The electronic design automation tool as recited in claim 18 wherein said faster clock cell and said slower clock cell have identical footprints.

20. The electronic design automation tool as recited in claim 15 wherein said slack analyzer and said clock cell delay adjuster are invoked multiple times to reach timing signoff.

* * * * *